A. N. HOVLAND.
METHOD OF AND APPARATUS FOR SENDING SIGNAL IMPULSES.
APPLICATION FILED FEB. 12, 1912.

1,133,726.  
Patented Mar. 30, 1915.

Witnesses:
B. Dommers
E. Leckert.

Inventor.
Abraham Nilsen Hovland
By Henry M. ? atty.

UNITED STATES PATENT OFFICE.

ABRAHAM NILSEN HOVLAND, OF CHRISTIANIA, NORWAY.

METHOD OF AND APPARATUS FOR SENDING SIGNAL-IMPULSES.

1,133,726. Specification of Letters Patent. Patented Mar. 30, 1915.

Application filed February 12, 1912. Serial No. 677,168.

*To all whom it may concern:*

Be it known that I, ABRAHAM NILSEN HOVLAND, a subject of the King of Norway, residing at Christiania, Norway, have invented certain new and useful Improvements in Methods of and Apparatus for Sending Signal-Impulses; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to a method of and apparatus for obtaining an accurate coöperation of two or more machines, apparatus or instruments in spite of variations of speed that may possibly occur.

To obtain accurate coöperation of two or more machines or apparatus for telegraphing purposes or for performing a given one of several possible movements either in line-telegraphy or in radio-telegraphy, complete synchronism or partial synchronism with automatic control is generally made use of.

To obviate both said methods I make the manner of operation of the coöperating stations such that the contact arms or the like of the stations, which at the transmitting station cause impulses of current to be transmitted in a predetermined succession or order and which at the receiving station transmit the action of said impulses of current to various members such as magnets or the like, both perform one revolution or a reciprocating movement at a time, both commencing simultaneously at zero, and the contact arm of the transmitter causing the contact arm of the receiver to be actuated at the same moment as the transmitter arm commences its motion. In this manner the difference which might possibly occur in the speed of the apparatus is reduced to naught for each individual operation. The specific purpose of the switch is to allow small variations in synchronism between two signaling devices arranged for substantially synchronous operation.

The accompanying drawings illustrate diagramatically the way in which the present method is carried out, Figures 1 to 4 being diagrams of various contact arrangements for apparatus for carrying out said method.

Figure 1:
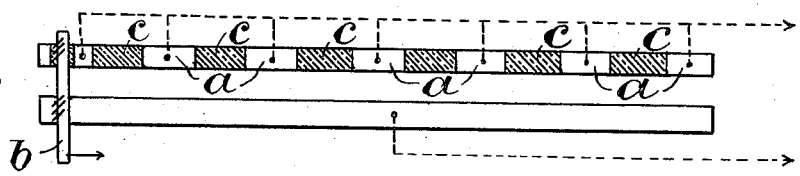
Figure 2:
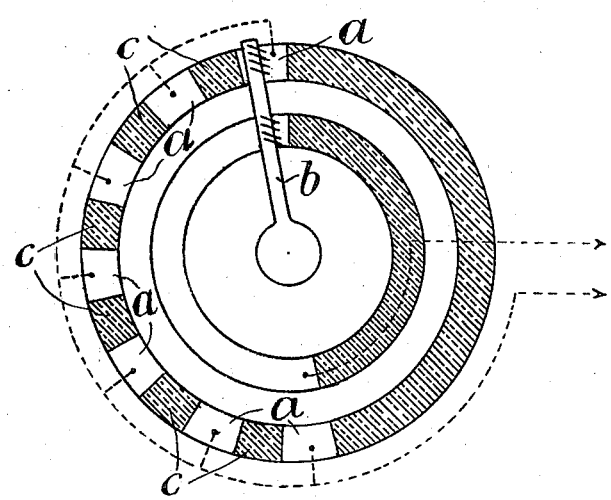

In Figs. 1 and 2 are shown diagrams of contact arrangements for rectilinear reciprocating and rotary motion of the contact arm, respectively. The contacts are denoted by $a$, $a$ and the contact arms by $b$, $b$. As will be seen the intervening spaces between the contacts are of the same size as the contacts $a$ themselves but they may also be of different size.

Figure 3:
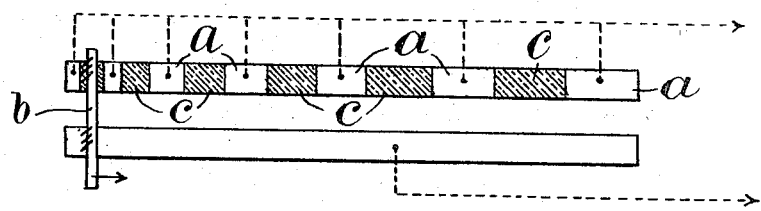
Figure 4:
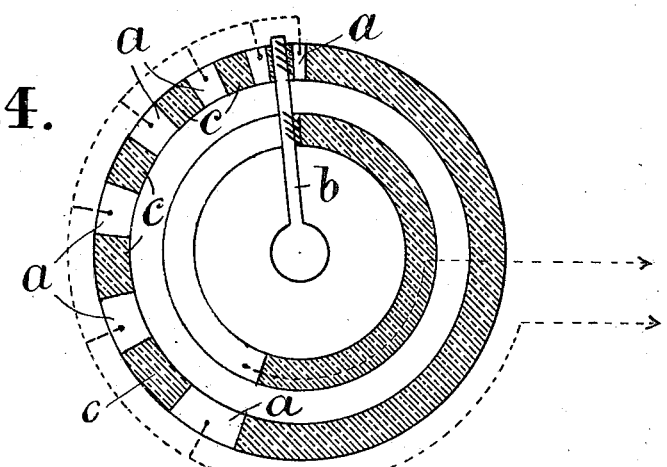

In Figs. 3 and 4, respectively are shown diagrams corresponding to those shown in Figs. 1 and 2, but here the spaces $c$ and the contacts $a$ are made of increasing length, so that the first contacts are the shortest and the last contact the longest.

The latter method especially allows of great variations of speed without disturbing the coöperation.

Claims:

1. The method of obtaining accurate coöperation of a plurality of telegraph instruments, which comprises closing the circuits of said instruments at increasing periods and simultaneously starting the closing of said circuits from zero position after each operation, and thereby preventing the cumulation of errors in synchronism.

2. The method of obtaining accurate coöperation of a plurality of telegraph instruments, which comprises sending and collecting current impulses in successively increasing periods, said impulses always starting from a zero position at the smallest time interval, and thereby preventing the cumulation of errors in synchronism.

3. A sunflower switch having a plurality of contacts insulated from each other and successively increasing in length.

4. A sunflower switch having alternating insulations and conductive contacts, both the insulations and contacts successively increasing in length.

In testimony that I claim the foregoing as my invention, I have signed my name in presence of two subscribing witnesses.

ABRAHAM NILSEN HOVLAND.

Witnesses:
HENRY HASPER,
WOLDEMAR HAUPT.